(12) United States Patent
Ito

(10) Patent No.: US 9,324,200 B2
(45) Date of Patent: Apr. 26, 2016

(54) WORK MACHINE, CONTROL SYSTEM FOR WORK MACHINE, AND CONTROL METHOD FOR WORK MACHINE

(71) Applicant: Komatsu Ltd., Tokyo (JP)

(72) Inventor: Fumiaki Ito, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 71 days.

(21) Appl. No.: 14/353,355

(22) PCT Filed: Dec. 11, 2013

(86) PCT No.: PCT/JP2013/083263
§ 371 (c)(1),
(2) Date: Apr. 22, 2014

(87) PCT Pub. No.: WO2015/040762
PCT Pub. Date: Mar. 26, 2015

(65) Prior Publication Data
US 2015/0310678 A1 Oct. 29, 2015

(51) Int. Cl.
*G01M 17/00* (2006.01)
*G09G 5/00* (2006.01)
*G07C 5/08* (2006.01)
*B60Q 9/00* (2006.01)
(Continued)

(52) U.S. Cl.
CPC ............ *G07C 5/0816* (2013.01); *B60Q 9/00* (2013.01); *B60Q 11/00* (2013.01); *E02F 9/26* (2013.01); *G01F 23/0076* (2013.01); *G07C 5/008* (2013.01); *G07C 5/0808* (2013.01); *G08B 21/182* (2013.01); *G08B 29/185* (2013.01)

(58) Field of Classification Search
USPC .......................................... 701/32.3; 345/629
See application file for complete search history.

(56) References Cited

U.S. PATENT DOCUMENTS

| 2002/0033833 A1* | 3/2002 | Kinugawa | .............. G07C 5/008 345/629 |
| 2003/0074134 A1* | 4/2003 | Shike | ....................... G08G 1/20 701/34.4 |

(Continued)

FOREIGN PATENT DOCUMENTS

| EP | 2615001 A2 | 7/2013 |
| JP | 57-104597 A | 6/1982 |

(Continued)

OTHER PUBLICATIONS

International Search Report and Written Opinion mailed Feb. 25, 2014, issued for PCT/JP2013/083263.

*Primary Examiner* — Thomas G Black
*Assistant Examiner* — Tyler Paige
(74) *Attorney, Agent, or Firm* — Locke Lord LLP

(57) ABSTRACT

A work machine includes a tank that stores liquid. The work machine includes a calculation unit configured to obtain a difference between an amount of the liquid inside the tank acquired at a first timing and an amount of the liquid inside the tank acquired at a second timing after the first timing, and a notification unit configured to notify abnormality information indicating occurrence of abnormality related to the tank in the case where an operating time of the work machine during a period from the first timing to the second timing is equal to or smaller than a first threshold and also the difference is equal to or larger than a second threshold, and further configured not to notify the abnormality information in the case where the operating time is larger than a second threshold.

12 Claims, 6 Drawing Sheets

(51) Int. Cl.
  *B60Q 11/00* (2006.01)
  *E02F 9/26* (2006.01)
  *G08B 21/18* (2006.01)
  *G01F 23/00* (2006.01)
  *G07C 5/00* (2006.01)
  *G08B 29/18* (2006.01)

(56) References Cited

U.S. PATENT DOCUMENTS

| | | | | |
|---|---|---|---|---|
| 2003/0109977 A1* | 6/2003 | Landes | ............... | F02D 41/083 701/54 |
| 2005/0217368 A1* | 10/2005 | Akahane | ............... | F02D 33/003 73/302 |
| 2006/0282213 A1* | 12/2006 | Withrow | ............ | B01D 53/9495 701/115 |
| 2007/0079804 A1* | 4/2007 | Nakayama | ......... | B60R 25/1004 123/339.15 |
| 2007/0142928 A1* | 6/2007 | Moughler | .......... | G05B 23/0283 700/12 |
| 2007/0168101 A1* | 7/2007 | Shibamori | ............... | E02F 9/26 701/50 |
| 2010/0161175 A1* | 6/2010 | Yamada | .................... | E02F 9/26 701/33.4 |
| 2010/0324955 A1* | 12/2010 | Rinehart | ............ | G06Q 10/0637 705/7.36 |
| 2014/0058635 A1* | 2/2014 | Furukawa | ............... | B60R 16/02 701/50 |
| 2014/0189585 A1* | 7/2014 | Brush | ................... | B60R 16/023 715/808 |

FOREIGN PATENT DOCUMENTS

| | | | | |
|---|---|---|---|---|
| JP | 09-142586 A | 6/1997 | | |
| JP | 2001-249045 A | 9/2001 | | |
| JP | 2001-266200 A | 9/2001 | | |
| JP | 2002-255299 A | 9/2002 | | |
| JP | 2005-067639 A | 3/2005 | | |
| JP | 2008-261259 A | 10/2008 | | |
| JP | 2013-181400 A | 9/2013 | | |
| WO | WO-2005/045778 A1 | 5/2005 | | |
| WO | WO 2005045778 A1 * | 5/2005 | ......... | B60R 25/1004 |
| WO | WO-2010026174 A1 | 3/2010 | | |

* cited by examiner

FIG.7

| WORK MACHINE TYPE | ID | EVENT | EVENT OCCURRENCE TIME | DETERMINATION TIME | POSITION |
|---|---|---|---|---|---|
| EXCAVATOR | 0001 | UREA WATER REDUCED | 2013.10.15 9:00:30 | 2013.10.15 9:00:00 | (X1, Y1, Z1) |

WORK MACHINE, CONTROL SYSTEM FOR WORK MACHINE, AND CONTROL METHOD FOR WORK MACHINE

FIELD

The present invention relates to a work machine, a control system for the work machine, and a control method for the work machine.

BACKGROUND

There is a known fuel control system in which a tank for storing liquid, such as a fuel tank which stores fuel, is provided in a work machine such as an excavator, and stealing of the fuel from the fuel tank is detected an alarm is issued (Patent Literature 1, for example).

CITATION LIST

Patent Literature

Patent Literature 1: International Patent Publication No. WO2005/045778

SUMMARY

Technical Problem

The amount of liquid inside tank may be reduced when there is a crack in a tank included in a work machine or when a malicious person stole the liquid inside the tank. In the event of such abnormal reduction of the liquid inside the tank, an operator or an administrator of the work machine requires to know immediately and surely about the tank abnormality. On the other hand, there may be a case where information of a residual amount of the fuel or the like may not be acquired due to, for example, malfunction of an in-vehicle signal line included in the work machine. In the case where the work machine operates while the information of the residual amount of the fuel or the like cannot be acquired, and later the malfunction of the in-vehicle signal line is resolved, the residual amount of the fuel or the like is reduced because the fuel or the like is consumed along with operation of the work machine at the time point when the malfunction of the in-vehicle signal line is resolved even though the abnormality has not occurred in the tank. Accordingly, there is a problem in that whether the liquid reduction inside the tank is caused by abnormality or normal consumption can be hardly grasped. According to the technology disclosed in Patent Literature 1, a type of the fuel used in a construction machine is discriminated so that use of non-permitted fuel is prevented. However, nothing is disclosed or suggested about the abnormal reduction of the liquid inside the tank and therefore the technology still has room for improvement.

The object of the present invention is to provide a work machine including a tank that stores liquid, in which the abnormal reduction of the liquid inside a tank is reliably and immediately notified to the operator or the administrator of the work machine.

Solution to Problem

According to the present invention, a work machine including a tank which stores liquid, the work machine comprises: a calculation unit configured to obtain a difference between an amount of the liquid inside the tank acquired at a first timing when the work machine stops operating and an amount of the liquid inside the tank acquired at a second timing after a timing when a key switch of the work machine is turned ON for a first time after the first timing; and a notification unit configured to notify abnormality information indicating occurrence of abnormal reduction of the liquid inside the tank in a case where an operating time of the work machine during a period from the first timing to the second timing is equal to or smaller than a first threshold and also the difference is equal to or larger than a second threshold, and further configured not to notify the abnormality information in a case where the operating time is larger than a first threshold.

In the present invention, it is preferable that the calculation unit acquires the amount of the liquid inside the tank at a plurality of different timings at the second timing and obtains a differences between the amount of the liquid inside the tank acquired at the first timing and the amount of the liquid acquired at each of the different timings at the second timing, and the notification unit notifies the abnormality information indicating occurrence of the abnormal reduction, of the liquid inside the tank in the case where the operating time of the work machine is equal to or smaller than a first threshold and also at least two or more differences consecutively acquired in time series among the acquired plurality of differences are equal, to or larger than the second threshold.

In the present invention, it is preferable that the work machine comprises a communication device configured to communicate with outside of the work machine, wherein the notification unit notifies the outside of the work machine of the abnormality information via the communication device.

In the present invention, it is preferable that the work machine comprises a position detector configured to detect a position of the work machine, wherein the notification unit notifies the outside of the work machine of positional information detected by the position detector together with the abnormality information.

In the present invention, it is preferable that the first timing is when the key switch of the work machine is turned OFF, and the second timing is when the key switch is turned ON for the first time after the key switch is turned OFF.

In the present invention, it is preferable that a work machine including a tank which stores liquid, comprises: a calculation unit configured to obtain a difference between an amount of the liquid inside the tank acquired at a first timing when a key switch of the work machine is turned OFF and an amount of the liquid inside the tank acquired at a second timing after a timing when the key switch is turned ON for a first time after the key switch was turned OFF; a notification unit configured to notify abnormality information indicating occurrence of abnormal reduction of the liquid inside the tank in a case where an operating time of the work machine during a period from the first timing to the second timing is equal to or smaller than a first threshold and also the difference is equal to or larger than a second threshold, and further configured not to notify the abnormality information in a case where the operating time is larger than a first threshold; a position detector configured to detect a position of the work machine; and a communication device configured to communicate with outside of the work machine, wherein the notification unit notifies the outside of the work machine of the abnormality information and the positional information via the communication device.

According to the present invention, a control system for a work machine comprises: a work machine including a tank configured to store liquid, a calculation unit configured to obtain a difference between an amount of the liquid inside the tank acquired at a first timing and an amount of the liquid inside the tank acquired at a second timing after the first timing, a first notification unit configured to notify abnormality information indicating occurrence of abnormal reduction of the liquid inside the tank in a case where an operating time of the work machine from the first timing to the second timing is equal to or smaller than a first threshold and the difference is equal to and larger than a second threshold, and also configured not to notify the abnormality information in a case where the operating time is larger than a first threshold, and a first communication device configured to transmit the abnormality information notified by the notification unit; and a control device including a second communication device configured to receive the abnormality information transmitted from the first communication device, and a second notification unit configured to notify the abnormality information received by the second communication device.

In the present invention, it is preferable that the calculation unit acquires an amount of the liquid inside the tank at least at a plurality of different timings at the second timing and obtains a difference between the amount of the liquid inside the tank acquired at the first timing and the amount of the liquid acquired at each of the different timings at the second timing, and the first notification unit notifies the abnormality information indicating occurrence of the abnormal reduction of the liquid inside the tank in a case where the operating time of the work machine is equal to or smaller than a first threshold and also at least two or more differences consecutively acquired in time series among the acquired plurality of differences are equal to or larger than the second threshold.

In the present invention, it is preferable that the work machine includes a position detector configured to detect a position of the work machine itself, and the first notification unit notifies the positional information detected by the position detector together with the abnormality information.

According to the present invention, a control method for a work machine including a tank which stores liquid, comprises: obtaining a difference between an amount of the liquid inside the tank acquired at a first timing and an amount of the liquid inside the tank acquired at a second timing after the first timing; notifying abnormality information indicating occurrence of abnormal reduction of the liquid inside the tank in a case where an operating time of the work machine during a period from the first timing to the second timing is equal to or smaller than a first threshold and the difference is equal to or larger than a second threshold; and not notifying the abnormality information in a case where the operating time of the work machine is larger than a first threshold.

In the present invention, it is preferable that the control method for a work machine further comprises: acquiring an amount of the liquid inside the tank at a plurality of different timings at the second timing; obtaining a difference between the amount of the liquid inside the tank acquired at the first timing and the amount of the liquid acquired at each of the different timings at the second timing; and notifying the abnormality information indicating occurrence of the abnormal reduction of the liquid inside the tank in a case where the operating time of the work machine is equal to or smaller than a first threshold and also at least two or more differences consecutively acquired in time series among the acquired plurality of differences are equal to or larger than the second threshold.

In the present invention, it is preferable that the control method for a work machine comprises notifying positional information of the work machine together with the abnormality information.

The present invention provides the work machine including the tank that stores the liquid, in which the abnormal reduction of the liquid inside the tank can be reliably and immediately notified to the operator or the administrator of the work machine.

BRIEF DESCRIPTION OF DRAWINGS

FIG. 7 is a diagram illustrating an exemplary screen displayed on a display device by the control device when abnormality information is received.

DESCRIPTION OF EMBODIMENTS

A configuration (embodiment) to implement the present invention will be described in detail with reference to the drawings.

<Outline of Control System 1 for Work Machine>

Figure 1:
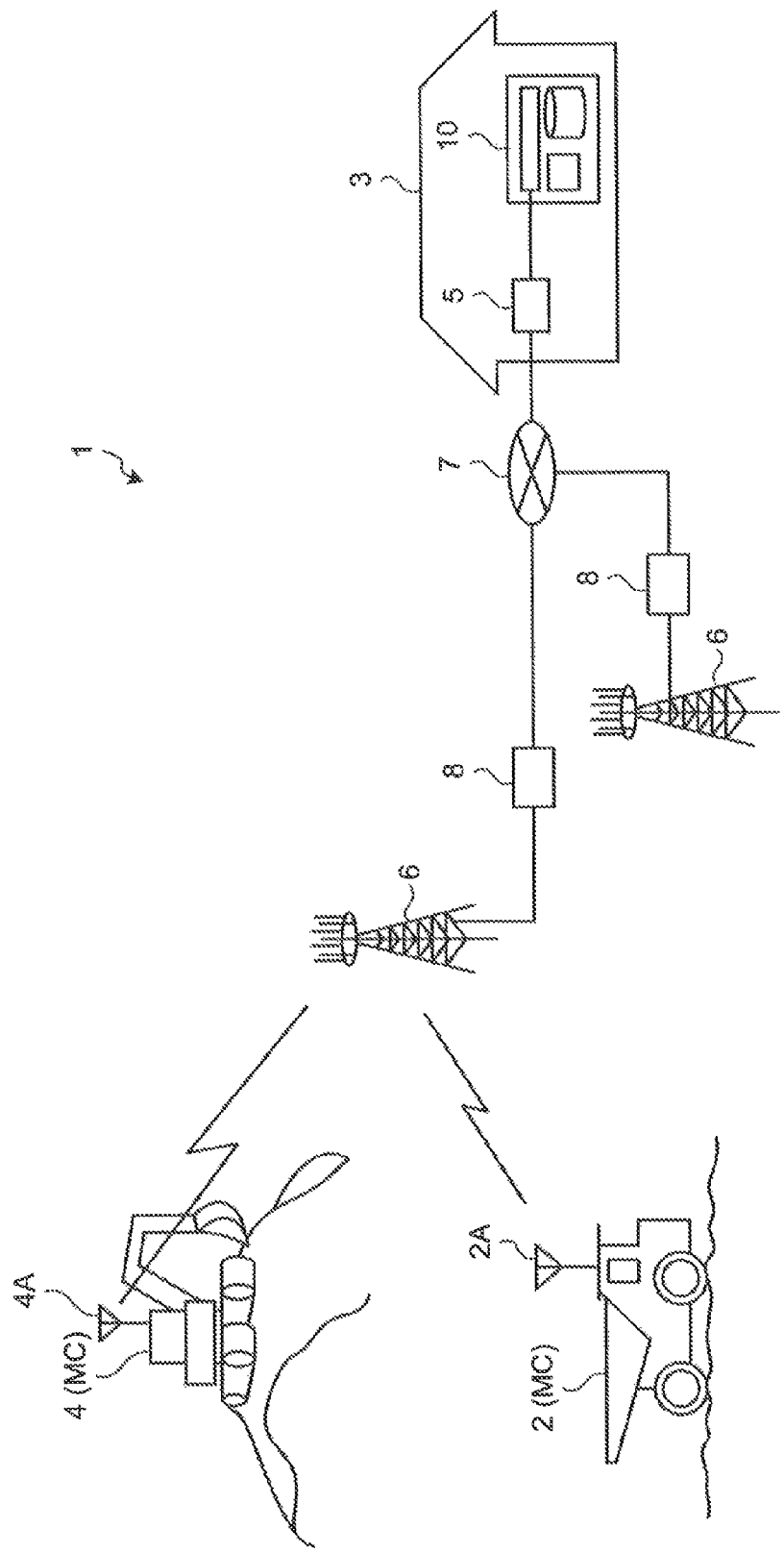
FIG. 1 is a diagram illustrating a case where a control system 1 of a work, machine according to an embodiment of the present invention is applied.

FIG. 1 is a diagram illustrating a case where a control system 1 of a work machine according to an embodiment of the present invention is applied. The control system 1 of the work machine (hereinafter conveniently referred to as control system) monitors abnormal reduction of liquid inside a tank that is provided in the work machine and stores the liquid such as fuel or urea water. In the exemplary case illustrated in FIG. 1, the control system 1 controls condition of a dump truck 2 and an excavator 4, but the work machine according to the present embodiment is not limited thereto. For instance, the control system 1 may control a wheel loader, a bulldozer, a forklift, or the like. In the following, the dump truck 2 and the excavator 4 are conveniently referred to as a work machine MC.

In the control system 1, a control device 10 collects, from the work machine MC, abnormality information that indicates occurrence of abnormal reduction of the liquid inside the tank included in the work machine MC via a wireless communication system or satellite communication applied to mobile communication such as mobile phones. The control device 10 is disposed in a control facility 3, for example. The control facility 3 may be located inside a site where the work machine MC operates, or in a place distant from the site where the work machine MC operates, such as a place where a service man or an administrator resides, executing preventive maintenance and the like for the work machine MC. Further, the control device 10 may be disposed in a predetermined place, or may be movable to a desired place like a mobile terminal having a function of the wireless communication.

According to the present embodiment, the control device 10 is connected to a communication line 7 via a communication device 5. The communication line 7 is connected to a switching system 8. The switching system 8 connects the communication line 7 to a base station 6. The switching system 8 interposed between the communication line 7 and a communication device included in the work machine MC has a role to relay the communication between the communication device and the control device 10. The base station 6 receives and modulates various kinds of information transmitted from the communication device included in the work machine MC, and transmits the information to the switching system 8.

The work machine MC transmits abnormality information collected by a processor 20 mounted on the work machine MC itself to the outside from antennas 2A and 4A. The control device 10 acquires the various kinds of information including the abnormality information transmitted from the communication device of the work machine MC via the base station 6, the switching system 8, the communication line 7 and the communication device 5. The abnormality information generated by the processor 20 of the work machine MC and acquired by the control device 10 is the information to notify occurrence of the abnormal reduction of the liquid inside the tank caused by stealing of the liquid inside the tank included in the work machine MC or leakage from some crack in the tank.

The processor may generate other information related to the operating condition of the work machine MC besides the abnormality information, and may transmit the information to the control device 10 as operational information. The operational information include, for example, positional information (latitude, longitude, or height coordinate) related to the position of the work machine MC, an operating time, a travel distance, an engine water temperature, a code indicating a type of abnormality, voltage condition of a storage battery, a residual amount of the fuel, a fuel consumption rate, load capacity, and so on. The operational information is not limited thereto and may include various kinds of information indicating the operating condition of the work machine in accordance with the types of the work machine: for instance, where and how long the work machine has operated, whether the work machine has operated smoothly, or whether any abnormality has occurred. Also, the operational information is not limited to the information indicating the past operating condition of the work machine and may be the information indicating current operating condition. The above operational information is used for preventive maintenance and fault diagnosis for the work machine MC, for example.

The control device 10 is capable of transmitting the information to be supplied to the work machine MC. In this case, the control device 10 transmits the information to be supplied to the work machine MC to the communication line 7 via the communication device 5. The information is modulated in the switching system 8 and transmitted from the base station 6 in a form of radio wave. The antennas 2A and 4A of the work machine MC receive the radio wave that has been transmitted from the base station 6 and includes the information to be supplied to the work machine MC. The communication device of the work machine MC executes demodulating and converting processing to the radio wave received by the antennas 2A and 4A such that the radio wave is changed back to the original information readable by the later-described processor 20, and then transmits the information to the processor 20 of the work machine MC. Thus, the work machine MC and the control device 10 can mutually exchange the information, using the wireless communication. Next, the control device 10 will be described more in detail.

<Control Device 10>

Figure 2:
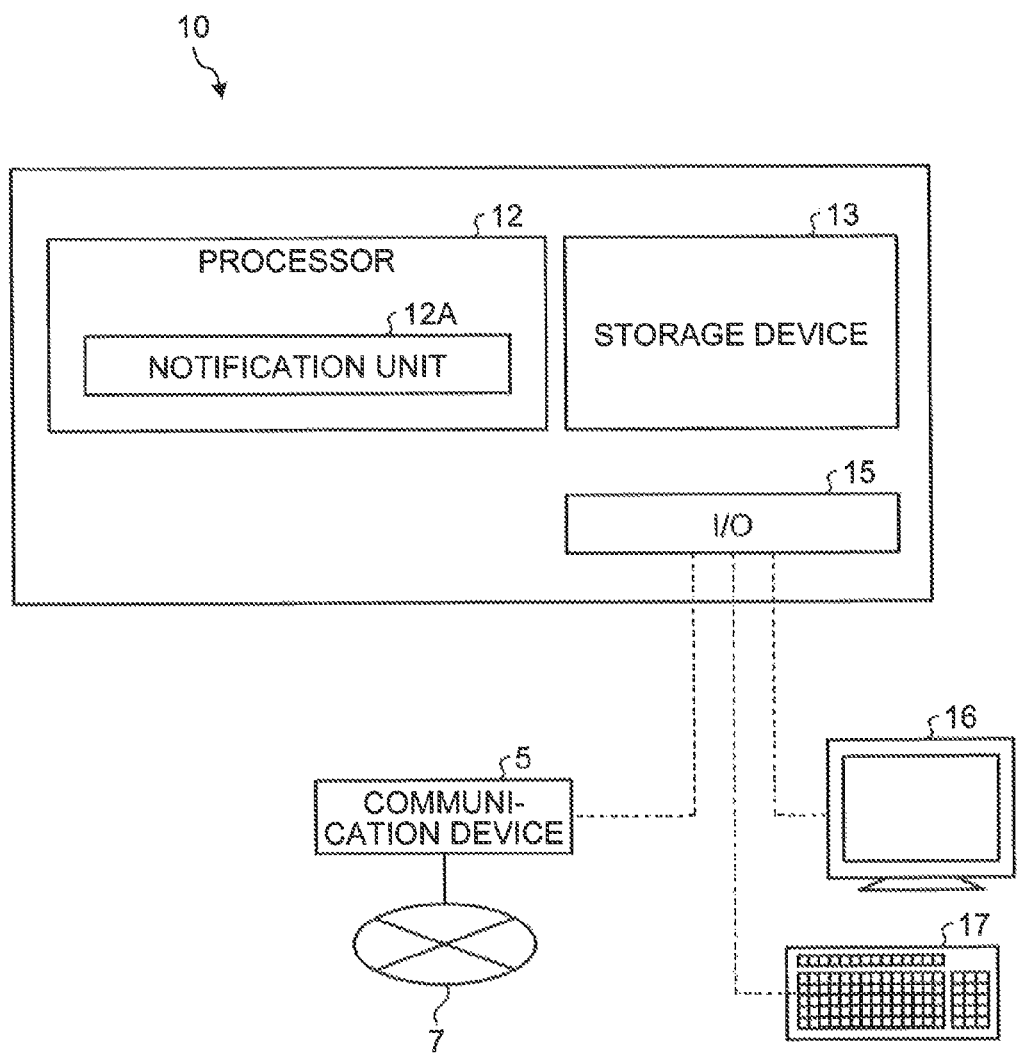
FIG. 2 is a functional block diagram illustrating a control device included in the control system.

FIG. 2 is a functional block diagram illustrating the control device 10 included in the control system 1. The control device 10 includes a processor 12, a storage device 13, and an input and output unit (I/O) 15. According to the present embodiment, the control device 10 further includes a communication device (second communication device) 5.

The I/O unit 15 of the control device 10 is electrically connected to a display device 16 as an output device, an input device 17, and the communication device 5. The processor 12 is, for example, a CPU (Central Processing Unit). The storage device 13 is formed of, for example, a RAM (Random Access Memory), a ROM (Read Only Memory), a flash memory, a hard disk drive, or combination thereof. The I/O unit 15 executes the information input/output with the processor 12 or with the storage device 13. Further, the I/O unit 15 executes the information input/output with the display device 16, the input device 17, or the communication device 5 which are connected to the control device 10.

The processor 12 executes a control method for the work machine according to the present embodiment. The processor 12 includes a notification unit (second notification unit) 12A. The notification unit 12A notifies the abnormality information transmitted from the communication device of the work machine MC illustrated in FIG. 1 and received by the communication device 5. The notification may be issued in various forms, for example, by displaying the abnormality information on the display device 16 or by issuing a sound. The function of the notification unit 12A is implemented by the processor 12 that reads out from the storage device 13 a computer program corresponding to the function of the notification unit 12A to execute the program.

The storage device 13 stores various kinds of computer programs to cause the processor 12 to execute various kinds of processing, the abnormality information acquired from the work machine MC, and the operational information on acquired from the work machine MC.

The display device 16 is, for example, a liquid crystal display. The input device 17 is, for example, a keyboard, a touch panel, or a mouse. Next, the work machine MC will be described more in detail.

<Work Machine MC>

Figure 3:
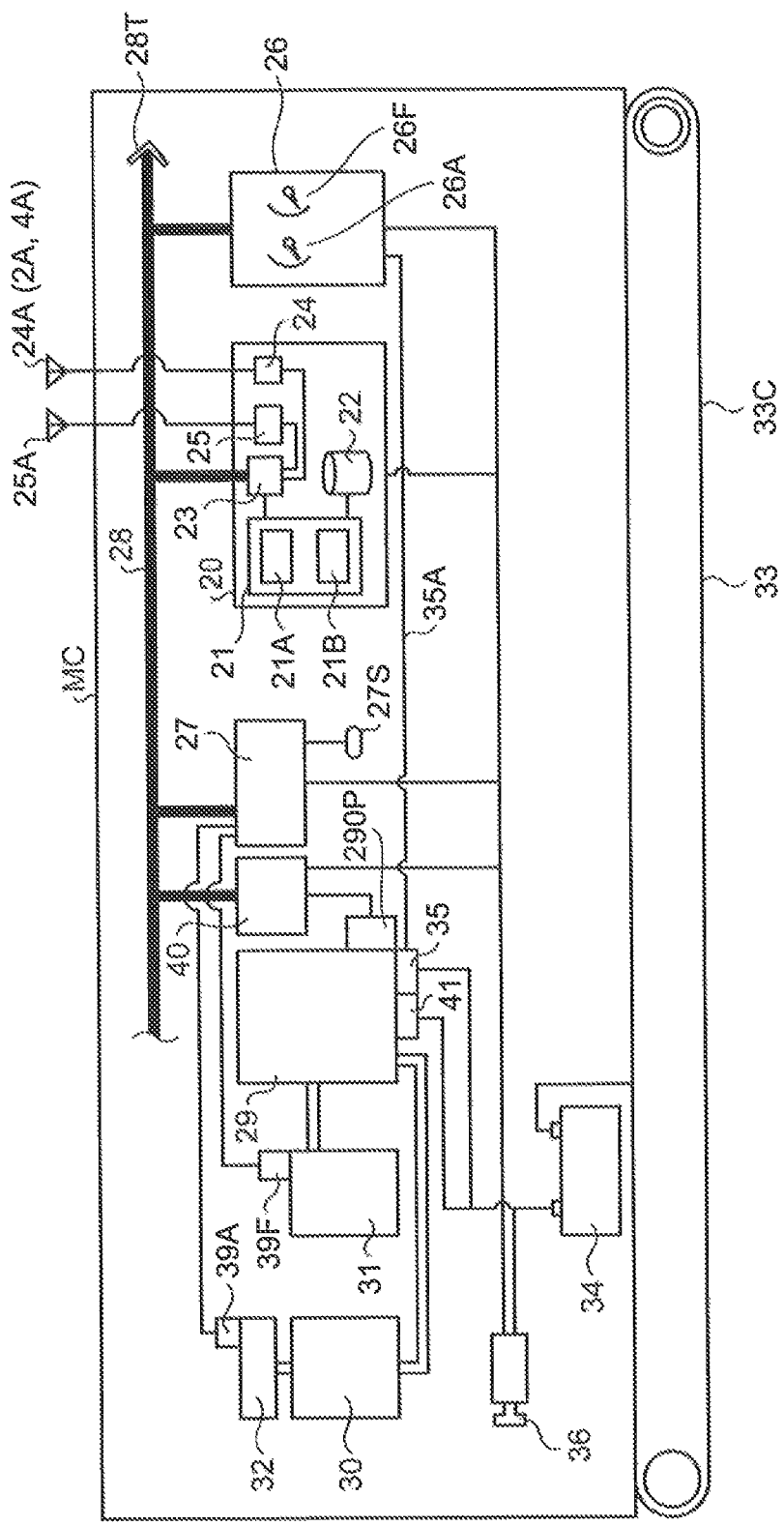
FIG. 3 is a diagram illustrating an example of the work machine.

FIG. 3 is a diagram illustrating an example of the work machine MC. The work machine MC includes the processor 20, a communication device (first communication device) 24, a position detector 25, a monitor 26, an engine control device 27, an in-vehicle signal line 28, an engine 29 as a power generator, an exhaust gas treatment device 30, a fuel tank 31 as a tank for storing the liquid, a urea water tank 32, and a travel device 33. In addition, the work machine MC according to the present embodiment includes a storage battery 34, an alternator 35, a key switch 36, a rotational speed sensor 38, liquid level detection sensors 39F and 39A as detectors to detect the liquid amount. Note that the present embodiment represents the case where an exhaust gas treatment system (exhaust gas treatment device 30 and urea water tank 32) using the urea water is provided in the work machine MC, but the present embodiment does not exclude a work machine MC that does not include such an exhaust gas treatment device.

The processor 20 includes a processing unit 21, a storage unit 22, and an input and output WO) unit 23. The processor 20 controls the work machine MC, generates the abnormality information, and collects the operational information. The processor 20 displays the generated abnormality information on a monitor 26, for example, and transmits the abnormality information to the outside of the work machine MC, more specifically, to the control device 10 illustrated in FIGS. 1 and 2 via the communication device 24 and the antenna 24A. Also, the processor 20 transmits the collected operational information to the control device 10 illustrated in FIGS. 1 and 2 via the communication device 24 and the antenna 24A.

The operational information includes the information obtained from various kinds of sensors such as a pressure sensor not illustrated, the rotational speed sensor 38, a temperature sensor, or the liquid level detection sensors 39A and 39F. For instance, the information obtainable from the pressure sensor is a hydraulic pressure of engine oil. Further, the information obtainable from the rotational speed sensor 38 is the rotational speed (engine speed per unit time) of the engine 29, and the information obtainable from the temperature sensor is a temperature of cooling water in the engine 29. The operational information further includes the information related to a position (latitude, longitude, or height coordinate) of the work machine MC detected by the position detector 25 and the information related, to abnormality having occurred in the work machine MC. The information related to abnormality having occurred in the work machine MC includes, for example, a type of error code, a kind of abnormality, or an occurrence time of the abnormality. The operational information is not limited to the information related to abnormality having occurred in the work machine MC and may include information which indicates that the work machine MC is normally operating, such as an operating time.

The processing unit 21 is formed of electronic components such as a CPU and a memory. The processing unit. 21 includes a calculation unit 21A and a notification unit (first notification unit) 21B. The calculation unit 21A obtains a difference between a liquid amount inside the tank acquired at a first timing when the operation of the work machine MC is stopped and a liquid amount inside the tank acquired at a timing later than the first timing (second timing). The first timing when the operation of the work machine MC is stopped may be, for example, when the key switch 36 is turned OFF and the engine 29 is stopped, or when a predetermined time has passed after stop of the engine 29. The second timing is a timing after the key switch 36 of the work machine MC is turned ON for the first time after the first timing, more specifically, is at least one of following timings: when the key switch 36 of the work machine MC is turned ON for the first time after the first timing; and a predetermined timing after the key switch 36 of the work machine MC is turned ON for the first time after the first timing. The tank is at least one of the fuel tank 31 and the urea water tank 32. In the case where the tank is the fuel tank 31, the liquid is the fuel necessary to drive the engine 29. In the case where the tank is the urea water tank 32, the liquid is the urea water necessary when the exhaust gas is cleaned in the exhaust gas treatment deice 30. According to the present embodiment, the liquid is not limited to at least one of the fuel and the urea water. For example, even in the case where the liquid is the cooling water of the engine 29 or hydraulic oil of a hydraulic actuator provided in the work machine MC, it is possible to reliably and immediately notify the operator or the administrator of the work machine of the abnormal reduction of the liquid inside the tank which stores the cooling water or the hydraulic oil by adopting the present embodiment.

The notification unit 21B notifies the abnormality information indicating occurrence of the abnormal reduction of the liquid inside the tank in the case where the operating time of the work machine MC is equal to or less than a first threshold and the above-mentioned difference obtained by the calculation unit 21A is equal to or more than a second threshold. The notification unit 21B does not notify the abnormality information in the case where the operating time of the work machine MC is larger than the first threshold. The details of the first threshold, the second threshold, and the difference will be described later.

The processing unit 21 collects the information related to the position of the work machine MC and the information related to the state of the work machine MC from the respective sensors of the work machine MC such as the engine control device 27, the position detector 25, and the liquid level detection sensors 39A and 395, and generates the operational information.

The storage unit 22 is formed of for example, a RAM (Random Access Memory), a ROM (Read Only Memory), a flash memory, a hard disk drive, or combination thereof. The storage unit. 22 stores the abnormality information and the operational information generated by the processing unit 21, and stores the information which is transmitted from the control device 10 and to be supplied to the work machine MC.

The storage unit 22 stores various kinds of computer programs. Examples of the computer programs stored in the storage unit 22 are: a computer program in which instructions of the processing to be executed by the processing unit 21 are described, a computer program in which instructions to generate, and notify the abnormality information are described, a computer program in which instructions of the processing to collect the operational information are described, and a computer program in which instructions to control the work machine MC are described. Further, the storage unit 22 stores various kinds of setting values to operate the control system 1 of the work machine. The processing unit 21 reads out the above-described computer programs and executes the processing corresponding to the computer programs that has been read.

The I/O unit 23 is electrically connected to the processing unit 21 and the in-vehicle signal line 28. The in-vehicle signal line 28 is, for example, a CAN (Controller Area Network). The in-vehicle signal line 28 is electrically connected to a monitor 26, a pump controller 40, and the engine control device 27 as well as to the processor 20 including the communication device 24. The processor 20 can mutually communicate with the monitor 26 or the engine control device 27 via the in-vehicle signal line 28. The in-vehicle signal line 28 is electrically connected to a terminal 28T. By connecting the terminal 28T to a terminal device or the like, the terminal device and the processor 20 and the like can mutually exchange the information via the terminal 28T and the in-vehicle signal line 28.

The above-described terminal device may have the communicating function and the storing function, like a personal computer, the mobile terminal, the storage medium, the reading device, and so on. Also, the abnormality information, operational information, etc, stored in the storage unit 22 and the like of the processor 20 may be downloaded to the above-described terminal devices by forming the terminal 28T with a wireless LAN (Local Area Network) device. Further, the abnormality information and the like may also be downloaded in the same manner by configuring the later described communication device 24 to have the function of the wireless LAN device.

As described above, the engine control device 27 is electrically connected to the monitor 26. Further, the liquid level detection sensors 39A and 39F and the rotational speed sensor 38 are electrically connected to the engine control device 27. The liquid level detection sensors 39A and 39F may be also electrically connected to the monitor 26. With this configuration, the monitor 26 may acquire the information of a residual amount of the fuel or the urea water detected by the liquid level detection sensors 39A and 39F via the engine control device 27, and also may receive an operation signal indicating that the engine 29 is in operation. The engine control device 27 acquires data indicating the amounts of the fuel and urea water from the liquid level detection sensors 39A and 39F in a predetermined cycle, and generates the information indicating the residual amounts of the fuel and urea water. Further, the engine control device 27 transmits the information indicating the residual amounts of the fuel and urea water to the monitor 26 in a predetermined cycle via the in-vehicle signal line 2, the case where malfunction or the like occurs in the in-vehicle signal line 28 connecting the engine control device 27 with the monitor 26, the information indicating the residual amounts of the fuel and urea water and the later-described operation signal are not transmitted to the monitor 26 from the engine control device 27.

The communication device 24 includes the antenna 24A. The communication device 24 is used when the processor 20 communicates with the outside of the work machine MC. According to the present embodiment, the communication device 24 is a wireless communication device. The communication device 24 is, for example, a communication modem. The communication device 24 executes mutual wireless communications with the base station 6 illustrated in FIG. 1 is the antenna 24A. The antenna 24A may be the antenna 2A of the dump truck 2 illustrated in FIG. 1, or the antenna 4A of the excavator 4, or other. The processor 20 transmits the above-described abnormality information and operational information via the antenna 24A and the communication device 24, and receives the information to be supplied from the control device 10.

The position detector 25 includes a GPS antenna 25A. The GPS antenna 25A receives the radio waves output from a plurality of GPS satellites constituting the GPS (Global Positioning System). The GPS antenna 25A outputs the received radio waves to the position detector 25. The position detector 25 converts the radio waves received by the GPS antenna 25A, and obtains the positional information of the work machine MC mounted with the position detector 25 by calculating (positioning) a positional information itself, namely the position of the position detector 25. The positional information is related to the position of the work machine MC, including the latitude, longitude, or height coordinate. In order that the position detector 25 measures the position itself, not only the GPS satellite but also other positioning satellite may be used. In short, what required is that position measurement by the GNSS (Global Navigation Satellite System) can be executed.

The monitor 26 is a display device that displays various kinds of information of the work machine MC and functions as an input device. The monitor 26 is, for example, a liquid crystal display device and may include a touch panel. Examples of the information displayed on the monitor 26 include the residual amount of the fuel stored in the fuel tank 31 and the residual amount of the urea water stored in the urea water tank 32. The residual amount of the fuel is displayed by a fuel gauge 26F, for example, and the residual amount of the urea water is displayed by a urea water gauge 26A, for example.

According to the present embodiment, the monitor 26 communicates with the processor 20, the engine control device 27 and so on by using a communications protocol applied to the in-vehicle signal line 28 such as the CAN, as described above.

The engine control device 27 controls the clean exhaust gas treatment device 30 configured to clean the exhaust gas emitted from the engine 29 and the engine. According to the present embodiment, the engine 29 is a diesel engine. The exhaust gas treatment device 30 cleans the exhaust gas by using urea SCR (Selective Catalytic Reduction). For this reason, the urea water to be supplied to the exhaust gas treatment device 30 is stored in the urea water tank 32.

The engine control device 27 controls the amount of the fuel to be supplied to the engine 29 based on the rotational speed of the crankshaft of the engine 29 detected by the rotational speed detection sensor 38, an opening level, of a fuel adjustment dial 27S, etc. Thus, the engine control device 27 controls the engine 29. The engine control device 27 controls the amount of the urea water to be supplied to the exhaust gas treatment device 30 base on an amount of nitrogen oxide contained inside the exhaust gas emitted from the engine 29 and the like. For instance, the exhaust gas treatment device 30 includes a sensor that detects the amount of nitrogen oxide contained inside the exhaust gas, and when the amount of nitrogen oxide detected by the sensor exceeds a predetermined amount, the exhaust, gas treatment device 30 supplies the urea water from the urea water tank 32 to an injector not illustrated, and the injector injects the urea water into the exhaust gas. The nitrogen oxide contained inside the exhaust gas is reduced (decomposed) by the urea water to nitrogen and water.

As described above, the engine control device 27 obtains the residual amount of the fuel inside the fuel tank, 31 based on the detected value of the liquid level detection sensor 39F that detects the fuel residual amount stored in the fuel tank 31. The engine control device 27 transmits the information indicating the obtained residual amount of the fuel to the monitor 26, and displays the residual amount of the fuel on the fuel gauge 26F, for example. The engine control device 27 obtains the residual amount of the urea water in the urea water tank 32 based on the detected value by the liquid level detection sensor 39A that detects the urea water amount stored in the urea water tank 32. The engine control device 27 transmits the obtained residual amount of the urea water to the monitor 26, and the monitor 26 displays the residual amount of the area water on the urea water gauge 26A, for example.

In normal operation, the engine control device 27 transmits a "signal indicating that the engine 29 is in operation" to the monitor 26 via the in-vehicle communication line 28, and the monitor 26 measures a time period of receiving signal and obtains an accumulated operating time (hereinafter conveniently referred to as operating time). Meanwhile, the engine control device 27 receives a signal from the rotational speed sensor 38 that detects the rotational speed of the engine 29, and generates the "signal indicating that the engine 29 is in operation" by using the received signal, and then transmits the generated signal to the monitor 26. Even when the "signal indicating that the engine 29 is in operation" is not transmitted from the engine control device 27 to the monitor 26 for some reason, a signal (predetermined voltage) is transmitted from the alternator 35 to the monitor 26. The monitor 26 measures the time period of receiving the signal from the alternator 35, and obtains the accumulated operating time. The monitor 26 can constantly measure the accumulated operating time even when the signal is transmitted from the alternator 35 to the monitor 26 for the accumulated operation time measurement and even when the signal is directly transmitted from the rotational speed sensor 38 to the monitor 26. The signal used to measure the accumulated operating time may be either one of the signal indicating that the engine 29 is in operation and the signal from the alternator 35.

The travel device 33 allows the work machine MC to travel, using the power generated by the engine 29. According to the present embodiment, the travel device 33 includes a hydraulic motor not illustrated and a crawler 33c. The hydraulic motor which is included in the travel device 33 but not illustrated is rotated by the hydraulic oil supplied from a hydraulic pump 290P driven by the engine 29. The discharge rate of the hydraulic oil from the hydraulic pump 290P is controlled by the pump controller 40. The hydraulic motor not illustrated rotates the crawler 33C, thereby the travel device 33 allowing the work machine MC to travel.

The work machine MC includes the storage battery 34. The storage battery 34 is a secondary battery such as a lead storage battery or a nickel-hydrogen storage battery. The storage battery 34 supplies the power to a starter 41 in order to start up the engine 29, and also supplies power to various kinds of electronic devices provided in the work machine MC, such as the processor 20. The storage battery 34 is charged with the power supplied from the alternator 35. Driving the alternator 35 in conjunction with driving the engine 29 generates the power. The power generated by the alternator 35 is charged to the storage battery 34.

A signal indicating that the power is generated by the alternator 35 (predetermined voltage, conveniently referred to as an alternator signal) is transmitted to the monitor 26 via a signal line 35A. The monitor 26 may determine whether the alternator 35 is normally actuating by receiving the alternator signal. Or, as described above, the monitor 26 may be configured to obtain the accumulated operating time of the work machine MC by measuring the time period of receiving the alternator signal.

The power supplied from the storage battery 34 is supplied via the key switch 36 to the electronic devices such as the starter 41, the pump controller 40, the engine control device 27, the processor 20, and the monitor 26. The key switch 36 is electrically connected to the storage battery 34, and further the key switch 36 is electrically connected to the pump controller 40, engine control device 27, processor 20, and monitor 26. The key switch 36 may be, for example, a key switch using a cylinder lock, a push-button type key switch, or an immobilizer key utilizing wireless communication. When the key switch 36 is turned ON, the power is supplied from the storage battery 34 to the pump controller 40, engine control device 27, processor 20, and monitor 26, then the key switch 36 is turned OFF, the power supplied from the storage battery 34 to the pump controller 40, engine control device 27, processor 20, and monitor 26 is cut off.

<Tank Abnormality Detection>

An operating site of the work machine MC is varied from an urban area to a back-country. The work machine MC sometimes is operated all day and night and sometimes is stopped during the night. Also, there is a case where the work machine MC is stopped and left for a long period. While the operation of the work machine is thus stopped, a malicious person may steal the fuel from the fuel tank 31 of the work machine.

Also, since the exhaust gas treatment device 30 included in the work machine MC according to the present embodiment uses the urea SCR, it is necessary to refill the urea water by the amount consumed. The urea water is rarely traded and hardly obtainable in some countries and regions. Therefore, the urea water may be stolen from the urea water tank 32 by a malicious person. In the case where there are cracks in the fuel tank 31, the urea water tank 32, pipelines of the fuel and urea water and the like, the fuel and urea water may leak from the cracks and the fuel stored in the fuel tank 31 and the urea water stored in the urea water tank 32 may be reduced.

Thus, the fuel stored in the fuel tank 31 and the urea water stored in the urea water tank 32 may be abnormally reduced due to occurrence of abnormality in the fuel tank 31 and the urea water tank 32 (hereinafter conveniently referred to tank abnormality). Examples of the tank abnormality may be the above-described stealing, the cracks in the fuel tank 31, the urea water tank 32 and so on. According to the present embodiment, the tank abnormality may include abnormality that occurs in a supply system of the fuel and urea water, for example, the cracks or the leakage at sealing of pipelines connecting portion.

When the key switch 36 of the work machine MC illustrated in FIG. 3 is turned ON, power is supplied from the storage battery 34 to the monitor 26 disposed near a driver seat, and the fuel gauge 26F and the urea water gauge 26A illustrated in FIG. 3 are displayed on the monitor 26. The fuel gauge 26F displays the residual amount of the fuel, and the urea water gauge 26A displays the residual amount of the urea water.

Figure 4:
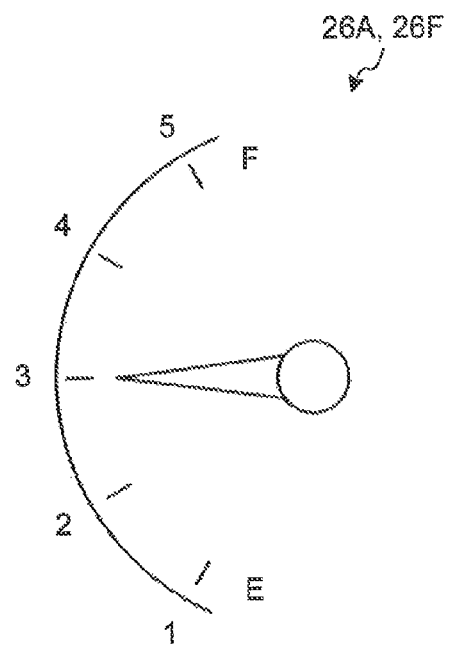
FIG. 4 is a diagram illustrating a fuel gauge and a urea water gauge at a first timing.
Figure 5:
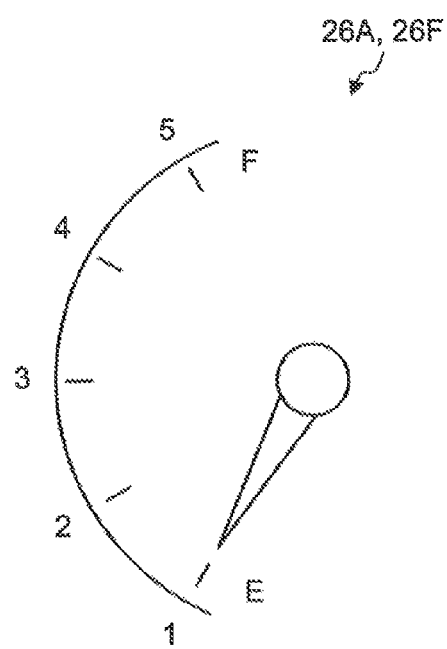
FIG. 5 is a diagram illustrating the fuel gauge and the urea water gauge at a second timing.

FIG. 4 is a diagram illustrating the fuel gauge 26F and the urea water gauge 26A at a first timing. Note that the residual amount of the fuel and the urea water may be indicated in other forms, such as a bar graph or a circle graph while the residual amount of the fuel and the urea water are indicated in a form of a meter in FIG. 4. FIG. 5 is a diagram illustrating the fuel gauge 26F and the urea water gauge 26A at a timing later than the first timing (second timing).

In the case where the meters illustrated in FIGS. 4 and 5 point toward a side F, the residual amount of the fuel or the urea water is large. In the case where the meters point toward a side F, the residual amount of the fuel or the urea water is small. Accordingly, the residual amount of the fuel or the urea water indicated at the second timing (FIG. 5) is smaller than the residual amount of the fuel or the urea water indicated at the first timing (FIG. 1). This indicates that the fuel, or the urea water is reduced during the period from the first timing to the second timing. The first timing is, for example, the timing when the operation of the work machine MC is finished and immediately before the key switch 36 illustrated in FIG. 3 is turned OFF. The second timing is, for example, the timing when the key switch 36 is turned ON after the first timing, or is the timing when the processor 20 initially achieves to acquire the information of the residual amount of the liquid and the like or an operating time Td2 from the monitor 26 after the key switch 36 is turned ON again after the first timing.

In the case where the operator of the work machine MC can recognize whether the residual amount of the fuel indicated by the fuel gauge 26F and the residual amount of the urea water indicated by the urea water gauge 26A are abnormally reduced, the operator recognizes the tank abnormality. For instance, in the case where the operator preliminarily memorizes the residual amounts of the fuel and urea water at the first timing and can determine that the residual amount of the fuel and the like visually checked on the monitor 26 at the second timing is smaller than the residual amount that the operator has memorized, the operator can recognize occurrence of the tank abnormality, such as stealing.

Thus, in the case where the operator finishes or starts operation by frequently checking the residual amounts indicated at the fuel gauge 26F and the urea water gauge 26A, the operator can find the abnormal reduction of the liquid inside the tank, such as stealing of the fuel and the urea water. However, such frequent check cannot be expected to all of the operators. Moreover, there is a case where a plurality of operators may use one work machine MC, and in many cases it is difficult for the operators to reliably and immediately find the abnormal reduction of the liquid inside the tank caused by stealing of the fuel and the urea water. Furthermore, in the case where an interval between the first timing and the second timing is long or in the case where a reduced amount of the fuel and the like is little, the operator may not recognize the abnormal reduction of the fuel and the like and consequently cannot find the occurrence of the tank abnormality unless otherwise the operator correctly memorizes the residual amounts indicated by the fuel gauge 26F and the urea water gauge 26A at the first timing.

According to the present embodiment, the calculation unit 21A of the processor 20 illustrated in FIG. 3 obtains a difference (hereinafter conveniently referred to as reduced liquid amount) between at least one of the fuel amount inside the fuel tank 31 and the urea water amount inside the urea water tank 32 acquired at the first timing and at least one of the fuel amount inside the fuel tank 31 and the urea water amount inside the urea water tank 32 acquired at the second timing. Next, in the case where the operating time of the work machine MC is equal to or less than the first threshold and the acquired reduced liquid amount is equal to or more than the second threshold, the notification unit 21B of the processor 20 generates and notifies the abnormality information indicating occurrence of the abnormal reduction of the liquid inside the tank. When the abnormality information is notified, a mode of display in the gauge corresponding to the tank where the liquid reduction has occurred may be changed or an alarm sound may be issued based on the abnormality information by using the monitor 26, thereby achieving to notify the abnormal reduction of the liquid inside the tank. The mode of display can be changed by changing colors, brightness, or background screen of the display, for example.

By thus changing the display mode, the work machine MC can reliably and immediately notify the abnormal reduction of the liquid inside the tank. Therefore, the operator of the work machine MC can reliably and immediately recognize the abnormal reduction of the liquid inside the tank. In this case, the operator does not have to memorize the residual amount of the fuel and the like at the first timing. Also, even in the case where the plurality of operators use one work machine MC, the respective operators can reliably and immediately recognize the abnormal reduction of the liquid inside the tank. The notification unit 21B transmits the abnormality information to the control device 10 illustrated in FIG. 2 via the communication device (first communication device) 24, thereby allowing the administrator of the work machine MC to reliably and immediately recognize occurrence of the abnormal reduction of the liquid inside the tank of the work machine MC. This enables the administrator to immediately plan and execute countermeasures against the tank abnormality. For instance, accessible mobile terminals such as a mobile phone and a personal computer are preliminarily set on the administrator's side of the work machine MC including the control device 10, so that the abnormality information may be transferred to an owner of the work machine MC, the administrator on the owner side, a service man or the like who owns the above mentioned mobile terminal and the like. This may allow the owner of the work machine MC, the service man or the like to immediately make arrangement to refill the fuel and call the police.

For instance, the processor 20 sometimes is not able to acquire the information of the residual amount of fuel and the like acquired by the liquid level detection, sensors 39F and 30A via the monitor 26 for some period due to malfunction of the in-vehicle signal line 28 illustrated in FIG. 3. The reason for such malfunction of the in-vehicle signal line 28 will be described below. In the case where the malfunction and the like occurs in the in-vehicle signal line 28 after the first timing and the key switch 36 of the work machine MC is turned. ON for the first time while the processor 20 cannot acquire the information of the residual amount of fuel and the like and later the malfunction of the in-vehicle signal line 28 is resolved, the residual amount of the fuel or the like is reduced at the time point when the malfunction of the in-vehicle signal line 28 is resolved because the fuel or the like is consumed by the operation of the work machine MC although the abnormal reduction of the liquid inside the tank has not occurred. The malfunction of the in-vehicle signal line 28 may be resolved in following cases: a case in which the malfunction of the in-vehicle signal line 28 occurs after the first timing but is resolved before the key switch 36 is turned ON; and another case in which the malfunction is resolved after the key switch 36 is turned ON for the first time after the first timing. In the former case, there is no problem of a false notification which will be described later. On the other hand, in the latter case, when the key, switch 36 is turned ON, the processor 20 still cannot acquire the information of the residual amount of the fuel and the like from the monitor 26 because the malfunction still continues in the in-vehicle signal line 28. However, when the malfunction of the in-vehicle signal line 28 is resolved later, the processor 20 comes to be able to acquire the information of the residual amount of the fuel and the like from the monitor 26, and this timing is to be the second timing. Further, comparing the information of the residual amount of the fuel and the like acquired at the first timing to the information of the residual amount of the fuel and the like acquired at the second timing, the fuel and the like turns out to be reduced. In other words, in the case where the malfunction of the in-vehicle signal line 28 occurs and is resolved during the period between the first timing and the second timing, the reduced liquid amount calculated by the calculation unit 21A sometimes exceeds the second threshold. In this case, the notification unit 21B may generate and notify the abnormality information although abnormal reduction of the liquid inside tank has not occurred. In other words, in the case where the malfunction or the like occurs in the in-vehicle signal line 28, the processor 20 may issue the false notification related to the abnormal reduction of the liquid inside the tank.

Assume that malfunction or the like has not occurred in the in-vehicle signal line 28 when the key switch 36 is turned ON for the first time after the first timing, but later the malfunction or the like occurs in the in-vehicle signal line 28 due to some reason while the key switch 36 is still turned ON. After that, assume that the malfunction or the like in the in-vehicle signal line 28 is resolved while the key switch 36 is kept turned ON. In other words, when the malfunction or the like in the in-vehicle signal line 28 is resolved, simultaneously the processor 20 having been unable to acquire the information of the residual amount of the fuel and the like and the information of the operating time comes to be able to acquire the information of the operating time. In this case also, the abnormality information may be generated and the false notification may be issue although the abnormal reduction of the liquid inside tank has not occurred. Thus, the second timing includes the timing when the information of the residual amount of the fuel and the like and the information of the operating time becomes acquirable, as described above. In other words, the second timing is a predetermined timing after the key switch 36 of the work machine MC is turned ON for the first time after the first timing.

According to the present embodiment, in the case where the operating time (cumulative value) of the work machine MC during the period from the first timing to the second timing is larger than the first threshold, the notification unit 21B neither generates nor notifies the abnormality information. Thus, since the notification unit 21B determines whether to generate and notify the abnormality information based on the operating time of the work machine MC, the abnormal reduction, of the liquid inside the tank can be correctly determined. As a result, the processor 20 can reduce issuance of the false notification related to the abnormal reduction of the liquid inside the tank, thereby achieving to improve reliability of the control system 1. The values of the first threshold and the second threshold above-described are optionally set and stored in the storage unit 22 of the processor 20 illustrated in FIG. 3.

According to the present embodiment, the malfunction of the in-vehicle signal line 28 includes disconnection, power source short circuit, ground line short circuit, line short circuit, termination resistor failure, signal change due to noise, and frame disappearance. The termination resistor failure is that the resistor provided on the in-vehicle signal line 28 becomes out of order. The frame disappearance is communication abnormality caused by noise mixing in the in-vehicle signal line 28.

The control device 10 illustrated in FIG. 2 can change, by remote control, the values of the first threshold and the second threshold stored in the storage unit 22 included in the processor 20 of the work machine MC via the communication line 7 illustrated in FIGS. 1 and 2. This improves convenience because nobody has to visit a site of the work machine MC in order to change the first threshold and second threshold. It is also possible to configure such that the operator or the service man of the work machine MC can change the values of the first threshold and the second threshold, using the terminal device or the like connected to the monitor 26 or the terminal 28T illustrated in FIG. 3.

The notification unit 21B illustrated in FIG. 3 may transmit (notify) the information related to a position of the work machine MC (positional information) detected by the position detector 25 illustrated in FIG. 3 to the outside of the work machine MC such as the control device 10 illustrated in FIGS. 1 and 2 together with the abnormality information via the communication device (first communication device) 24. This enables the administrator and the like of the work machine MC to grasp, through the control device 10, occurrence of the abnormal reduction of the liquid inside the tank as well as the position of the work machine MC where the abnormal reduction of the liquid, inside the tank has occurred. Therefore, refill of the fuel and arrangement of maintenance can be immediately conducted. Next, a control method for the work machine according to the present embodiment will be described.

<Control Method for Work Machine>

Figure 6:
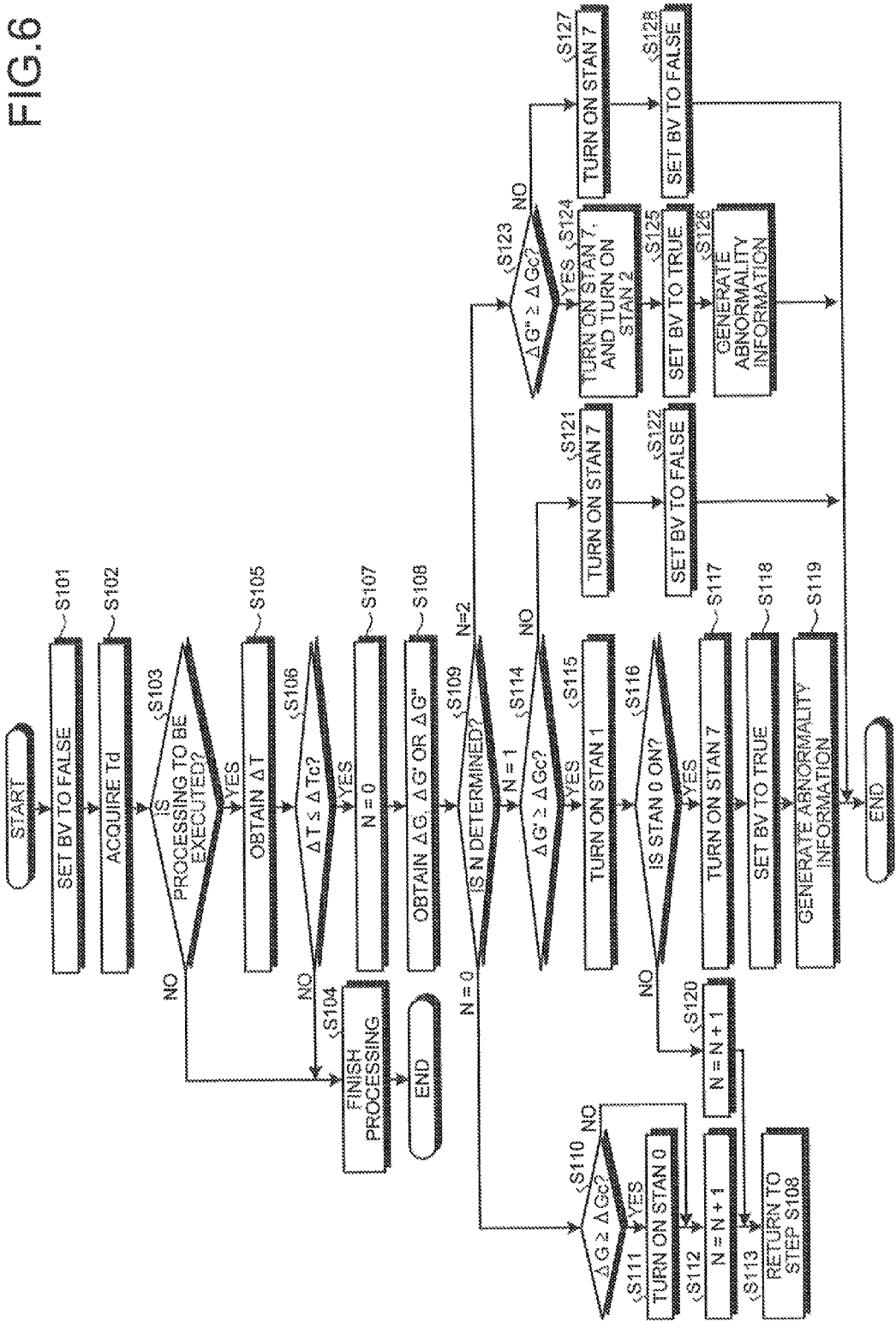
FIG. 6 is a flowchart for describing a control method for the work machine according to the embodiment of the present invention.

FIG. 6 is a flowchart for describing the control method for the work machine according to the present embodiment. The control method of the work Machine according to the present embodiment is mainly implemented by the processor 20 of the work machine MC illustrated in FIG. 3. According to the present embodiment, the timing (second timing) when the processor 20 illustrated in FIG. 3 detects the abnormal reduction of the liquid inside the tank is when the key switch 36 illustrated in FIG. 3 is turned ON, for example, but is not limited thereto. As described above, the second timing includes the timing when the malfunction is resolved and the processor 20 comes to be able to acquire the information of the residual amount of the fuel or the like after occurrence of the malfunction in the in-vehicle signal line 29 after the first timing.

The process illustrated in FIG. 6 is executed by using, as a trigger, obtainment of the information of the residual amount of the fuel or the like by the processor 20 from the monitor 26. To detect the abnormal reduction of the liquid inside the tank, the processing unit 21 of the processor 20 sets a value of a determination value BV to FALSE in step S101. Setting the determination value BV to FALSE indicates that the abnormal reduction of the liquid and the like is not occurring inside the tank, and setting the determination value BV to TRUE indicates that the abnormal reduction of the liquid and the like is occurring inside the tank. In the case where the determination value BV is FALSE, the abnormal reduction of the liquid inside the tank is not occurring. In the case where the determination value BV is TRUE, the abnormal reduction of the liquid inside the tank is occurring. More specifically, the determination value BV containing the TRUE value is the abnormality information. Therefore, in the first step S101, FALSE is set as an initial value of the determination value BV.

In step S102, the processing unit 21 acquires the cumulative value Td of the time that the work machine MC has operated (hereinafter conveniently referred to as operating time). According to the present embodiment, the operating time Td is measured by the monitor 26, but not limited to thereto. For instance, the engine control device 27 may measure the operating time Td. The processing unit 21 acquires the operating time from the monitor 26.

In the case where no malfunction is occurring in the in-vehicle signal line 28, the processor 20 requests the monitor 26, at predetermined intervals, to provide the information of the residual amounts of the fuel and the urea water and the operating time Td as described below. The monitor 26 transmits the information of the residual amounts of the fuel and the urea water and the operating time Td to the processor 20.

In the normal operation, the engine control device 27 transmits to the monitor 26 an operation signal indicating that the engine 29 is in operation. The monitor 26 obtains the operating time Td by measuring and accumulating the time of receiving the operation signal. The engine control device 27 acquires the signal from the rotational speed sensor 38 that detects the rotational speed of the engine 29, and generates the operation signal based on the signal in the case where the operation signal is not transmitted to the monitor 26 from engine control device 27 due to some reason such as the malfunction in the in-vehicle communication line 28 connecting the engine control device 27 with the monitor 26, the monitor 26 switches to receive the above-described alternator signal (predetermined voltage) supplied from the alternator 35 and obtains the operating time Td by measuring and accumulating the time of receiving the alternator signal. The method of obtaining the operating time Td is not limited thereto. For instance, the monitor 26 may acquire the operating time Td by directly receiving the signal from the rotational speed sensor 38 and accumulating the time of receiving this signal.

In the case where the malfunction or the like occurs in the in-vehicle signal line 28 connecting the engine control device 27 to the monitor 26, the above-mentioned operation signal is not transmitted to the monitor 26 from the engine control device 27. However, as described above, the monitor 26 switches to obtain the operating time Td based on the alternator signal. Accordingly, in the case where no malfunction or the like occurs in the in-vehicle signal line 28 connecting the monitor 26 to the processor 20, the operating time Td is continuously transmitted to the processor 20.

In step S103, the processing unit 21 determines whether to execute a processing to detect the abnormal reduction of the liquid inside the tank. For instance, in the case where the operating time Td is reduced due to data damage or the like of the operating time Td newly acquired, the processing to detect the abnormal reduction of the liquid inside the tank is not executed because there is high possibility that abnormality is occurring in the control system of the work machine MC including the processor 20, the monitor 26 and so on. In the case where the processing unit 21 determines not to execute the processing to detect the abnormal reduction of the liquid inside the tank (step S103: No), the processing to detect the abnormal reduction of the liquid inside the tank is finished in step S104. According to the present embodiment, the operating time Td is used to determine whether to execute the processing to detect the abnormal reduction of the liquid inside the tank, but it is also possible to use other matter other than the operating time Td to determine whether to execute the processing to detect the abnormal reduction of the liquid inside the tank. For instance, it is possible to configure that the processing that starts from step S105 to detect the abnormal reduction of the liquid inside the tank is executed when a difference between a time acquired at the timing when the key switch 36 is turned OFF last time and a time acquired at the timing when the key switch is turned ON again is equal to or more than a specific threshold. Meanwhile, the processing in step S103 may be skipped as well.

In the case of determining to execute the processing to detect the abnormal reduction of the liquid inside the tank (step S103: Yes), the processing unit 21 obtains the difference ΔT of the operating time Td (hereinafter conveniently referred to as operating time difference) in step S105. The operating time difference ΔT is a value obtained by subtracting the operating time Td at the first timing from the operating time Td at the second timing, and corresponds to the operating time of work machine MC during the period between the first timing and the second timing. As described above, according to the present embodiment, the first timing is when the key switch 36 is turned OFF last time, and the second timing is the timing when the key switch 36 is turned ON again, after the first timing or when the processor 20 achieves to acquire the information of the residual amount of the liquid and the like or the operating time Td2 from the monitor 26 for the first time after the key switch 36 is turned ON again after the first timing.

The processing unit 21 of the processor 20 acquires the operating time Td at the first timing and stores the operating time Td in the storage unit 22. Assume that the operating time at this point is Td1. The processing unit 21 acquires the operating time Td at the second timing and stores the operating time Td in the storage unit 22. Assume that the operating time at this point is Td2. The processing unit 21 obtains the operating time difference ΔT based on the operating time Td1 and the operating time Td2. The operating time difference is ΔT=Td2−Td1.

Next, the processing unit 21 compares the operating time difference ΔT with the operating time threshold ΔTc as the first threshold in step S106. The operating time threshold ΔTc is predetermined and stored in the storage unit 22. The operating time threshold ΔTc can be set to, for example, between five and ten minutes, but not limited thereto. In the case where the operating time difference ΔT is equal to or less than the operating time threshold ΔTc (step S106: Yes), the processing unit 21 proceeds to the processing in step S107. In the case where the operating time difference ΔT is larger than the operating time threshold ΔTc (step S106: No), the processing unit 21 finishes the processing to detect the abnormal reduction of the liquid inside the tank in step S104. This reduces possibility of issuing the false notification related to the abnormal reduction of the liquid inside the tank even in the case where abnormality occurred and is resolved in the in-vehicle signal line 28 illustrated in FIG. 3 while the information used for obtaining the reduced liquid amount is acquired.

In step S107, the processing unit 21 sets the number of determining times N to zero. The number of determining times N is number of times that the notification unit 21B of the processing unit 21 executes comparison between the reduced liquid amount and the second threshold. The comparison between the reduced liquid amount and the second threshold will be described later. Next, in step S108, the calculation unit 21A obtains the reduced liquid amount ΔG. In the following, the reduced liquid amount of the fuel is indicated as ΔGf and the reduced liquid amount of the urea water is indicated as ΔGa, and in the case of not differentiating between both liquid, the reduced liquid amount is indicated as ΔG.

The monitor 26 illustrated in FIG. 3 acquires the information indicating the residual amount (hereinafter conveniently referred to as residual amount information) of the fuel and the urea water (hereinafter conveniently referred to as fuel and the like) from the liquid level detection sensor 39F of the fuel tank 31 and the liquid level detection sensor 39A of the urea water tank 32, and displays the respective residual amounts at the fuel gauge 26F and the urea water gauge 26A based on the acquired information. The processing unit 21 of the processor 20 requests the monitor 26 to provide the residual amount information at predetermined intervals (every ten seconds, for example), and acquires the information from the monitor 26. The processing unit 21 can acquire the residual amount information that more reflects the actual operating condition by requesting the residual amount information every ten seconds.

The processor 20 receives the acquired residual amount information from the display device and stores the same in the storage unit 22. The processing unit 21 stores the latest residual amount information in the storage unit 22 when the key switch 36 illustrated in FIG. 3 is turned OFF, namely, at the first timing. Here, the residual amount information is expressed as (F1, A1). The residual amount information that the storage unit 22 stores at the first timing is not necessarily the information at the timing when the key switch 36 is turned OFF but may be the residual amount information at the timing when a certain time has passed after the key switch 36 was turned. OFF. This stabilizes the liquid level of the fuel and the urea water inside the fuel tank 31 and the urea water tank 32. Therefore, the storage unit 22 can store the more correct residual amount information.

The monitor 26 acquires the residual amount information from the liquid level detection sensors 39F and 39A again and transmits the residual amount information to the processor 20 when the key switch of the work machine MC is turned ON or when the processor 20 achieves to acquire the residual amount information of the liquid and the like or the operating time Td2 from the monitor 26 for the first time after the key switch 36 is turned ON again after the first timing, namely, at the second timing. This residual amount information is expressed as (F2, A2). The calculation unit 21A of the processor 20 obtains a difference, i.e., the reduced liquid amount ΔG, between the residual amount information (F1, A1) stored in the storage unit 22 when the key switch is turned OFF, namely, at the first timing, and the residual amount information (F2, A2) at present, namely, at the second timing. The reduced liquid amount ΔGf of the fuel is calculated by F1−F2, and the reduced liquid amount ΔGa of the urea water is calculated by A1−A2. For example, in the case where the fuel or the urea water is refilled during the period between the first timing and the second timing, the magnitude relation becomes F1=F2 or A1≤A2. In this case, both the reduced liquid amount ΔGf and the reduced liquid amount ΔGa become zero.

After obtaining the reduced liquid amount ΔG, the processing unit 21 determines a value of the number of determining times N in step S109. In the case where the number of determining times N is zero, the notification unit 21B of the processing unit 21 illustrated in FIG. 3 compares the reduced liquid amount ΔG with the reduced liquid amount threshold ΔGc which is the second threshold in step S110. Note that, in the following description, the comparison between the reduced liquid amount ΔG and the reduced liquid amount threshold ΔGc which is the second threshold in view of the magnitude relation is conveniently referred to as comparative determination. Further, in the case where the reduced liquid amount ΔG is equal to or larger than the reduced liquid amount threshold ΔGc (step S110: Yes, step S114: Yes, and step S123: Yes), the result is conveniently referred to as "comparative determination result is abnormal". In the case where the above-described magnitude relation cannot be established (step S110: No, step S114: No, step S123: No), the result is conveniently referred to as "comparative determination result is normal".

The reduced liquid amount threshold ΔGc is predetermined and stored in the storage unit 22 of the processor 20. In the case where the reduced liquid amount ΔG is equal to or larger than the reduced liquid amount threshold ΔGc, i.e., in the case where ΔG≥ΔGc (step S110: Yes), the notification unit 21B turns ON a determination result STAN0 in the first determination of the reduced liquid amount ΔG. The determination result STAN0 ON indicates ΔG≥ΔGc in the first determination, of the reduced liquid amount ΔG. In other words, the result indicates that the comparative determination result was abnormal.

In the case where the determination result STAN0 is turned ON in step S111 or in the case where the reduced liquid amount ΔG is smaller than the reduced liquid amount threshold ΔGc, i.e., in the case of ΔG<ΔGc (step S110: No), the processing unit 21 determines in step 2112 that a value obtained by adding one to the number of determining times N is the new number of determining times N. Since the number of determining times N before adding one is zero, the number of determining times N after adding one becomes one in the case of ΔG<ΔGc (step S110: No), the determination result STAN0 becomes an OFF state. The result indicates ΔG<ΔGc in the first determination of the reduced liquid amount ΔG. In other words, the state indicates that the comparative determination result was normal.

The residual amount information is acquired when the predetermined interval (ten seconds, for example) has passed from the timing when the reduced liquid amount ΔG was obtained in step S108. More specifically, as described above, the processing unit 21 of the processor 20 requests the monitor 26 to provide the residual amount information at the predetermined intervals (ten seconds, for example), and acquires the information from the monitor 26. Then, a second comparative determination is executed.

In the following, outline of the number of determining times in the comparative determination will be described. According to the present embodiment, the comparative determination is executed at least twice or more. The second comparative determination is executed regardless the comparative determination result obtained in the first comparative determination (step S110). Further, in the case where the comparative determination result is abnormal in the second comparative determination when the comparative determination result was abnormal in the first comparative determination (step S110: Yes), the abnormality information is generated because abnormality determination has been obtained consecutively twice. Additionally, in the case where the first comparative determination result is normal (step S110: No) and the second comparative determination result is also normal, the processing illustrated in FIG. 6 ends, but in the case where the second comparative determination result is abnormal, a third comparative determination is executed. In the case where the third comparative determination result is normal, the processing illustrated in FIG. 6 ends. However, in the case where the third comparative determination result is also abnormal, the abnormality information is generated because the abnormality determination has been obtained consecutively twice in the second and third determinations. The processing after the first comparative determinations will be described below in detail.

The processing return: to step S108 (step S113) after adding one to the number of determining times N in step S112. In step S108, the calculation unit 21A acquires residual amount information (F2', A2') at the second timing and also at the timing different from the timing of obtaining the reduced liquid amount ΔG to be compared with the first reduced liquid amount threshold ΔGc. The different timing is, as described above, when the predetermined interval preliminarily set has passed from the timing when the reduced liquid amount ΔG is initially obtained in step S108. The calculation unit 21A obtains the reduced liquid amount ΔG' (reduced liquid amount ΔGf', reduced liquid amount ΔGa') based on the residual amount information (F2', A2') and the residual amount information (F1, A1) acquired at the first timing. The reduced liquid amount ΔGf' is calculated by F1=F2' and the reduced liquid amount ΔGa' is calculated from A1−A2'. Thus, according to the present embodiment, the amounts of the fuel and the urea water inside the fuel tank 30 and the urea water tank 32 are acquired at a plurality of different timings at the second timing, and the reduced liquid amounts ΔG, ΔG' are obtained at the respective timings.

After obtaining the reduced liquid amount ΔG' in step S108, the processing unit 21 determines the value of the number of determining times N in step S109. As described above, since the number of determining times N is equal to one, the processing proceeds to step S114. In step S114, the notification unit 216 of the processing unit 21 illustrated in FIG. 3 executes the comparison (comparative determination) between the reduced liquid amount ΔG' and the reduced liquid amount threshold ΔGc which is the second threshold. In the case where the comparative determination result is abnormal, i.e., in the case of ΔG'≥ΔGc (step S114: Yes), the notification unit 21B turns ON the determination result STAN1 in the second determination of the reduced liquid amount ΔG' in step S155. The determination result STAN0 ON indicates ΔG≥ΔGc in the second determination of the reduced liquid amount ΔG'. In other words, the result indicates that the comparative determination result was abnormal.

Next, in step S116, the notification unit 216 determines whether the first determination result STAN0 is ON or not in the case where STAN0 is ON (step S116: Yes), this indicates that the reduced liquid amounts ΔG, ΔG' are equal to or larger than the reduced liquid amount threshold ΔGc consecutively twice. In other words, the comparative determination result is abnormal, consecutively twice. In this case, the notification unit 21B turns ON a determination final value STAN7 that indicates an end of the processing to detect the abnormal reduction of the liquid inside the tank in step S117. In the case where the determination final value STAN7 is ON, this indicates that the processing to detect the abnormal reduction of the liquid inside the tank ends.

Next, in step S118, the notification unit 21B sets the determination value BV to TRUE, and generates the determination value BV set to TRUE as the abnormality information in step S119. Then, the notification unit 21B notifies the abnormality information by transmitting the abnormality information to, for example, the monitor 26 illustrated in FIG. 3 or to the control device 10 illustrated in FIG. 1. With this notification, the processing to detect the abnormal reduction of the liquid inside the tank ends.

In the case where STAN0 is OFF in step S116 (step S116: No), this indicates that the reduced liquid amount ΔG is smaller than the reduced liquid amount threshold ΔGc (ΔG<ΔGc) in the first determination while the reduced liquid amount ΔG' is equal to or larger than the reduced liquid amount threshold ΔGc (ΔG'≥ΔGc) in the second determination. In other words, this indicates that the second comparative determination result is abnormal in this case, the notification unit 21B of the processing unit 21 determines in step S120 that a value obtained, by adding one to the number of determining times N is the new number of determining times N. Since the number of determining times N before adding one is one, the number of determining times N after adding one becomes two in the second determination.

In the case of ΔG'<ΔGc (step S114: No), i.e., in the case where the abnormality determination result is normal, this does not indicate that the reduced liquid amounts ΔG, ΔG' are smaller than the reduced liquid amount threshold ΔGc consecutively twice. According to the present embodiment, the notification unit 21B generates and notifies the abnormality information in the case where the reduced liquid amounts ΔG, ΔG' are equal to or larger than the reduced liquid amount threshold ΔGc consecutively twice among a plurality of consecutive determinations. Therefore, in the case of ΔG'<ΔGc (step S114: No), the notification unit 21B turns ON the determination final value STAN7 indicating the end of the processing to detect the abnormal reduction of the liquid inside the tank in step S121.

In the case where the reduced liquid amounts ΔG, ΔG' are not smaller than the reduced liquid amount threshold ΔGc consecutively twice, it is determined that no abnormal reduction of the liquid inside the tank occurred during the period between the first timing and the second timing. In other words, in the case where the reduced liquid amounts ΔG, ΔG' are equal to or larger than the reduced liquid amount threshold ΔGc consecutively twice, e.g., in the case where the comparative determination results are not abnormal consecutively twice, reliability of determining that the abnormal reduction, of the liquid inside the tank is occurring cannot be assured. Therefore, the notification unit 21B sets the determination value BV to FALSE in step S122. When the determination value BV is set to FALSE, the processing to detect the abnormal reduction of the liquid inside the tank ends. In other words, the notification unit 21B neither generates nor notifies the abnormality information. According to the present embodiment, the abnormality information is generated on the condition that it is determined that the reduced liquid amounts ΔG, ΔG' are smaller than the reduced liquid amount threshold ΔGc consecutively twice, in other words, the reduced liquid amounts ΔG, ΔG' are equal to or larger than the reduced liquid amount threshold ΔGc consecutively twice. Therefore, determination on that the abnormal reduction of the liquid inside the tank has not occurred can be correctly made.

The processing returns to step S108 (step S113) after one is added to the number of determining times N in step S120 above described. In step S108, the calculation unit 21A acquires the residual amount information (F2", A2") at the second timing and also at the timing different from the timing of obtaining the reduced liquid amount ΔG to be compared with the second reduced liquid amount threshold ΔGc. The different timing is, as described above, when the predetermined interval (ten seconds, for example) has passed from the timing when the second reduced liquid amount ΔG is obtained in step S108. The calculation unit 21A obtains the reduced liquid amount ΔGf", work machine ΔGa" from the residual amount information (F2", A2") and the residual amount information (F1, A1) acquired at the first timing. The reduced liquid amount ΔGf" is calculated by F1−F2", and the reduced liquid amount ΔGa" is calculated by A1−A2".

After the reduced liquid amount ΔG" is obtained in step S108, the processing unit 21 determines a value of the number of determining times N in step S109. As described above, the number of determining times N is equal to 2, the processing proceeds to step S123. In step S123, the notification unit 21B of the processing unit 21 illustrated in FIG. 3 executes comparison (comparative determination) between the reduced liquid amount ΔG" and the reduced liquid amount threshold ΔGc which is the second threshold. In the case where the comparative determination result is abnormal, i.e., in the case of ΔG" ≥ ΔGc (step S123: Yes), the notification unit 21B turns ON the determination final value STAN7 indicating the end of the processing to detect the abnormal reduction of the liquid inside the tank and turns ON the determination result STAN2 in the second determination of the reduced liquid amount ΔG' in step S124. The determination result STAN2 ON indicates ΔG"≤ΔGc in the third determination of the reduced liquid amount. ΔG". In other words, the result indicates that the comparative determination result was abnormal.

Next, in step S125, the notification unit 21B sets the determination value BV to TRUE, and generates the determination value BV set to TRUE as the abnormality information in step S126. Then, the notification unit 21B notifies the abnormality information by transmitting the abnormality information to, for example, the monitor 26 illustrated in FIG. 3 or to the control device 10 illustrated in FIG. 1. With this notification, the processing to detect the abnormal reduction of the liquid inside the tank ends.

In step S123, in the case where the comparative determination result is normal, i.e., in the case of ΔG"<ΔGc (step S123: No), the reduced liquid amount ΔG' is equal to or larger than the reduced liquid amount threshold ΔGc in the second determination while the reduced liquid amount ΔG" is smaller than the reduced liquid amount threshold ΔGc in the third determination. According to the present embodiment, as described above, the notification unit 21B generates and notifies the abnormality information in the case where the reduced liquid amount ΔG is equal to or larger than the reduced liquid amount threshold ΔGc consecutively twice, i.e., in the case where the comparative determination result is abnormal consecutively twice among a plurality of consecutive determinations. In the case of ΔG"<ΔGc (step S123: No), the notification unit 21B turns ON the determination final value STAN7 indicating the end of the processing to detect the abnormal reduction of the liquid inside the tank in step S127.

Next, the notification unit 21B sets the determination value BV to FALSE in step S128. In other words, the notification unit 21B neither generates nor notifies the abnormality information. When the determination value BV is set to FALSE, the processing to detect the abnormal reduction of the liquid inside the tank ends.

FIG. 7 is a diagram illustrating an exemplary screen (notifying information) displayed on the display device 16 by the control device 10 when abnormality information is received. The control device 10 having received the abnormality information, more specifically, the information indicating that the determination value BV is TRUE, displays the information as illustrated in FIG. 7 on the screen of the display device 16 illustrated in FIG. 2. The example illustrated in FIG. 7 is the case where the abnormal reduction of the liquid has occurred inside the urea water tank 32, indicating reduction of the urea water in the item of event. In FIG. 7, the event is displayed by characters, but may be displayed by some picture that indicates the reduced urea water or fuel.

Additionally, a type of the work machine MC, for example, an excavator or a wheel loader, is also displayed besides the event, i.e., the content of the abnormality information. The type of the work machine MC may be indicated by automobile rank. The type of work machine MC may also be displayed by some picture that indicates the type, automobile rank or the like. Also, as illustrated in FIG. 7, the screen of the display device 16 may also display an ID number to identify the work machine MC, a time when the tank abnormality occurred (event occurrence time a time of determining occurrence of the abnormal reduction of the liquid inside the tank (determination time), and a position based on the positional information of the work machine MC. The ID may be the information that can identify an individual work machine MC, such as a product serial number of the work machine MC, a phone number or a product serial number of the communication device 24.

As for the event occurrence time and the determination time, the time acquired by using a clock IC not illustrated and provided in the processor 20 may be utilized. The event occurrence time and the determination time are preferably indicated with both date and time as illustrated in FIG. 7 in order to grasp the correct event occurrence time and the like. Meanwhile, the event occurrence time and the determination time may be the time when the communication device 24 transmits the abnormality information to the control device 10 based on the abnormal reduction of the liquid inside the tank. In this case, the time acquired by using the clock IC not illustrated and provided in the communication device 24 may be utilized. Further, the determination time may be the timing when the position detector 25 measures the position of the work machine MC. The timing when the position detector 25 measures the position of the work machine MC may be a time preliminarily set or a time when the abnormality information is transmitted to the control information 10. The positional information is not limited to the latitude, longitude, or height coordinate value as illustrated in FIG. 7, and may be displayed in a map where the position of the work machine MC is marked. With these information, the administrator can identify the work machine MC in which the abnormal reduction of the liquid inside the tank has occurred and the position thereof.

The processing unit 21 determines whether the abnormal reduction of the liquid occurs in each of the fuel tank 31 and the urea water tank 32 and identifies in which one of the tanks the abnormal reduction has occurred when determining occurrence of the abnormal reduction of the liquid inside the tank. The notification unit 21B of the processing unit 21 generates the determination value BV for each of the tanks, and transmits the determination value BV to the control device 10 together with the type, ID, positional information, and so on of the work machine MC. The processor 12 of the control device 10 can grasp in which tank the abnormal reduction of the liquid has occurred based on the acquired determination value BV. Therefore, the notification unit 12A of the processor 12 selects a display form of the event to be displayed on the display device 16 and generates the notifying information.

According to the present embodiment, to determine that the abnormal reduction of the liquid inside the tank has occurred, the abnormality information is generated in the case where the reduced liquid amount $\Delta G$ became equal to or larger than the reduced liquid amount threshold $\Delta Gc$ consecutively twice in time series without executing a third determination, however, the manner of determination is not limited thereto. For instance, determining whether the abnormal reduction of the liquid inside the tank has occurred may be constantly executed three times, and the abnormality information may be generated in the case where the reduced liquid amount $\Delta G$ is equal to or larger than the reduced liquid amount threshold $\Delta Gc$ consecutively twice in time series among the three times determinations. Further, determining whether the abnormal phenomenon of the liquid inside the tank has occurred may be also executed four times or more. According to the present embodiment, the abnormality information is generated on the condition that the reduced liquid amount. $\Delta G$ is equal to or larger than the reduced, liquid amount threshold $\Delta Gc$ consecutively twice in time series, but the condition is not limited thereto. The abnormality information may be generated when the reduced liquid amount $\Delta G$ is equal to or larger than the reduced liquid amount threshold $\Delta Gc$ consecutively at least twice in time series.

The embodiment of the present invention has been described above, but the embodiment of the present invention is not limited to the contents thereof. Further, the components disclosed above may include components easily conceivable by a person skilled in the art and substantially identical, so to say, any components included in the equivalent scope. Also, the components disclosed above may be suitably combined. Additionally, at least one of omission, replacement and modification of the components may be made without departing from the scope of the technical concepts of the embodiment of the present invention.

REFERENCE SIGNS LIST

1 CONTROL SYSTEM
3 CONTROL FACILITY
5 COMMUNICATION DEVICE
6 BASE STATION
7 COMMUNICATION LINE
8 SWITCHING SYSTEM
10 CONTROL DEVICE
12 PROCESSOR
12a NOTIFICATION UNIT
13 STORAGE DEVICE
20 PROCESSOR
21 PROCESSING UNIT
21A CALCULATION UNIT
21B NOTIFICATION UNIT
22 STORAGE UNIT
23 I/O UNIT
24 COMMUNICATION DEVICE
25 POSITION DETECTOR
26 MONITOR
26A UREA WATER GAUGE
26F FUEL GAUGE
27 ENGINE CONTROL DEVICE
28 IN-VEHICLE SIGNAL LINE
29 ENGINE
31 FUEL TANK
32 UREA WATER TANK
35 ALTERNATOR
36 KEY SWITCH
38 ROTATIONAL SPEED SENSOR
39A, 39B LIQUID LEVEL. DETECTION SENSOR.
BV DETERMINATION VALUE
MC WORK MACHINE
Td, Td1, Td2 OPERATING TIME
$\Delta G$, $\Delta Ga$, $\Delta Gf$ REDUCED LIQUID AMOUNT
$\Delta Gc$ REDUCED LIQUID AMOUNT THRESHOLD
$\Delta Tc$ OPERATING TIME DIFFERENCE

The invention claimed is:

1. A work machine including a tank which stores liquid, the work machine comprising:
a calculation unit configured to obtain a liquid amount difference which is a difference between an amount of the liquid inside the tank detected at a first timing when the work machine stops operating and an amount of the liquid inside the tank detected at a second timing after a timing when a key switch of the work machine is turned ON for a first time after the first timing, wherein in a case where the calculation unit is not able to acquire the amount of the liquid due to malfunction occurred in an in-vehicle signal line after the first timing, the second timing is a timing when the calculation unit comes to be able to acquire the amount of the liquid after the malfunction of the in-vehicle signal line is resolved; and a notification unit configured to notify abnormality information indicating occurrence of abnormal reduction of the liquid inside the tank in a case where an operating time difference of the work machine during a period from the first timing to the second timing is equal to or smaller than a first threshold and also the liquid amount difference is equal to or larger than a second threshold, and further configured not to notify the abnormality information in a case where the operating time difference of the work machine during the period from the first timing to the second timing is larger than the first threshold and also the liquid amount difference is equal to or larger than the second threshold.

2. The work machine according to claim 1, wherein
the calculation unit acquires the amount of the liquid inside the tank at a plurality of different timings at the second timing and obtains a differences between the amount of the liquid inside the tank acquired at the first timing and the amount of the liquid acquired at each of the different timings at the second timing, and the notification unit notifies the abnormality information indicating occurrence of the abnormal reduction of the liquid inside the tank in the case where the operating time of the work machine is equal to or smaller than a first threshold and also at least two or more differences consecutively acquired in time series among the acquired plurality of differences are equal to or larger than the second threshold.

3. The work machine according to claim 1, comprising a communication device configured to communicate with outside of the work machine,
wherein the notification unit notifies the outside of the work machine of the abnormality information via the communication device.

4. The work machine according to claim 1, comprising a position detector configured to detect a position of the work machine,
wherein the notification unit notifies the outside of the work machine of positional information detected by the position detector together with the abnormality information.

5. The work machine according to claim 1, wherein the first timing is when the key switch of the work machine is turned OFF, and the second timing is when the key switch is turned ON for the first time after the key switch is turned OFF.

6. A work machine including a tank which stores liquid, comprising:
a calculation unit configured to obtain a liquid amount difference which is a difference between an amount of the liquid inside the tank detected at a first timing when a key switch of the work machine is turned OFF and an amount of the liquid inside the tank detected at a second timing after a timing when the key switch is turned ON for a first time after the key switch was turned OFF, wherein in a case where the calculation unit is not able to acquire the amount of the liquid due to malfunction occurred in an in-vehicle signal line after the first timing, the second timing is a timing when the calculation unit comes to be able to acquire the amount of the liquid after the malfunction of the in-vehicle signal line is resolved;

a notification unit configured to notify abnormality information indicating occurrence of abnormal reduction of the liquid inside the tank in a case where an operating time difference of the work machine during a period from the first timing to the second timing is equal to or smaller than a first threshold and also the liquid amount difference is equal to or larger than a second threshold, and further configured not to notify the abnormality information in a case where the operating time difference of the work machine during the period from the first timing to the second timing is larger than the first threshold and also the liquid amount difference is equal to or larger than the second threshold;

a position detector configured to detect a position of the work machine; and a communication device configured to communicate with outside of the work machine, wherein the notification unit notifies the outside of the work machine of the abnormality information and the positional information via the communication device.

7. A control system for a work machine, comprising:
a work machine including
a tank configured to store liquid,
a calculation unit configured to obtain a liquid amount difference which is a difference between an amount of the liquid inside the tank detected at a first timing and an amount of the liquid inside the tank detected at a second timing after the first timing, wherein in a case where the calculation unit is not able to acquire the amount of the liquid due to malfunction occurred in an in-vehicle signal line after the first timing, the second timing is a timing when the calculation unit comes to be able to acquire the amount of the liquid after the malfunction of the in-vehicle signal line is resolved, a first notification unit configured to notify abnormality information indicating occurrence of abnormal reduction of the liquid inside the tank in a case where an operating time difference of the work machine from the first timing to the second timing is equal to or smaller than a first threshold and the liquid amount difference is equal to and larger than a second threshold, and also configured not to notify the abnormality information in a case where the operating time difference of the work machine during the period from the first timing to the second timing is larger than the first threshold and also the liquid amount difference is equal to or larger than the second threshold, and a first communication device configured to transmit the abnormality information notified by the notification unit; and a control device including
a second communication device configured to receive the abnormality information transmitted from the first communication device, and
a second notification unit configured to notify the abnormality information received by the second communication device.

8. The system according to claim 7, wherein
the calculation unit acquires an amount of the liquid inside the tank at least at a plurality of different timings at the second timing and obtains a difference between the amount of the liquid inside the tank acquired at the first timing and the amount of the liquid acquired at each of the different timings at the second timing, and the first notification unit notifies the abnormality information indicating occurrence of the abnormal reduction of the liquid inside the tank in a case where the operating time of the work machine is equal to or smaller than a first threshold and also at least two or more differences consecutively acquired in time series among the acquired plurality of differences are equal to or larger than the second threshold.

9. The control system for the work machine according to claim 7, wherein the work machine includes a position detector configured to detect a position of the work machine itself, and the first notification unit notifies the positional information detected by the position detector together with the abnormality information.

10. A control method for a work machine including a tank which stores liquid, comprising:

obtaining a liquid amount difference which is a difference between an amount of the liquid inside the tank acquired at a first timing and an amount of the liquid inside the tank acquired at a second timing after the first timing, wherein in a case where the calculation unit is not able to acquire the amount of the liquid due to malfunction occurred in an in-vehicle signal line after the first timing, the second timing is a timing when the calculation unit comes to be able to acquire the amount of the liquid after the malfunction of the in-vehicle signal line is resolved;

notifying abnormality information indicating occurrence of abnormal reduction of the liquid inside the tank in a case where an operating time difference of the work machine during a period from the first timing to the second timing is equal to or smaller than a first threshold and the liquid amount difference is equal to or larger than a second threshold; and not notifying the abnormality information in a case where the operating time difference of the work machine during the period from the first timing to the second timing of the work machine is larger than the first threshold and also the liquid amount difference is equal to or larger than the second threshold.

11. The control method for a work machine according to claim 10, further comprising:

acquiring an amount of the liquid inside the tank at a plurality of different timings at the second timing;

obtaining a difference between the amount of the liquid inside the tank acquired at the first timing and the amount of the liquid acquired at each of the different timings at the second timing; and notifying the abnormality information indicating occurrence of the abnormal reduction of the liquid inside the tank in a case where the operating time of the work machine is equal to or smaller than a first threshold and also at least two or more differences consecutively acquired in time series among the acquired plurality of differences are equal to or larger than the second threshold.

12. The control method for a work machine according to claim 10, comprising notifying positional information of the work machine together with the abnormality information.

* * * * *